A. R. ELLISON.
PROCESS OF TREATING PONTIANAK.
APPLICATION FILED OCT. 13, 1909. RENEWED APR. 23, 1913.
1,104,744.
Patented July 21, 1914.
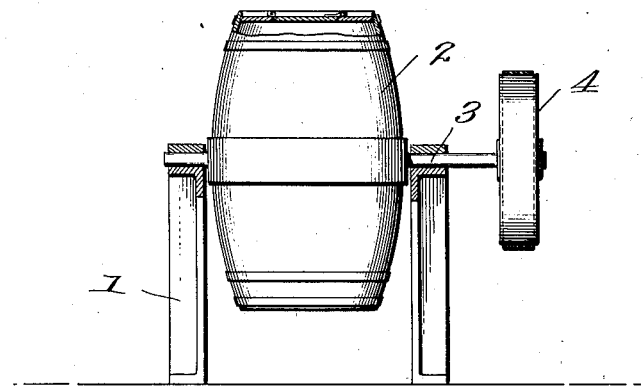

UNITED STATES PATENT OFFICE.

ALBERT R. ELLISON, OF BROOKLINE, MASSACHUSETTS.

PROCESS OF TREATING PONTIANAK.

1,104,744.  Specification of Letters Patent.  Patented July 21, 1914.

Application filed October 13, 1909, Serial No. 522,467. Renewed April 23, 1913. Serial No. 763,181.

*To all whom it may concern:*

Be it known that I, ALBERT R. ELLISON, a citizen of the United States, residing at Brookline, in the county of Suffolk and State of Massachusetts, have invented certain new and useful Improvements in Processes of Treating Pontianak; and I do hereby declare the following to be a full, clear, and exact description of the invention, such as will enable others skilled in the art to which it appertains to make and use the same.

My invention relates to a process of treating pontianak, and has for its object to produce a high grade of india rubber therefrom.

To these ends the invention consists in the novel steps, and combinations of steps, constituting my process, all as will be more fully hereinafter disclosed and particularly pointed out in the claims.

Referring to the accompanying drawings forming a part of this specification in which the figure is a diagrammatic view of one form of apparatus suitable for carrying out my process:—1. indicates any suitable support; 2 any suitable revolving receptacle pivoted at 3, and 4 a pulley driven from any suitable source of power.

In carrying out my process I preferably take equal parts of acetone, acetone oil and naphtha, and keep the mixture a weak precipitant by making either the acetone or acetone oil, or both, slightly in excess of the naphtha. In this mixture, when acting on the pontianak, I have the naphtha acting as a solvent, and the acetone, or the acetone oil, or both, acting as a precipitant, and the latter counteracts in a sense the action of the former. When the mixture is prepared I place the whole in any suitable vessel such as 2, and place the pontianak therein after being washed and dried. The pontianak may be in pieces of any convenient size or shape; and I then subject the whole to a vigorous agitation as by revolving the vessel 2 from the source of power for a period of from say six to ten hours, after which the pieces of pontianak are found to have been deresinated leaving rubber of a very high grade, which is then taken out and boiled thoroughly in water for from fifteen to thirty minutes to remove all traces of chemicals. After this boiling the rubber may be put through any of the processes, or subjected to any of the treatments, including vulcanization, to which high grade rubber is usually subjected. The mixture in the vessel 2 may now be recovered by distillation in any suitable form of still, thereby removing all impurities; after which it may be used over and over again, and strengthened at intervals to make it a slight precipitant.

I have found by actual tests that I am enabled by the process above disclosed to recover as much as from fifteen per cent. to twenty per cent. of rubber from the pontianak, and I prefer to use about eight pounds of pontianak to nine gallons of the mixture, and I prefer to carry out the process at ordinary temperatures and pressures. Good results, however, may be obtained by omitting the acetone oil and using the acetone in the proportion of two parts to one of naphtha, or two parts of acetone oil may be used to one part of naphtha if the acetone is omitted. Of course, other solvents than naphtha may also be used, but I prefer the latter.

It is obvious that those skilled in the art may vary the steps and proportions without departing from my invention, and therefore I do not wish to be understood as being limited to the details disclosed, except as may be required by the claims.

What I claim is:—

1. The process of obtaining india rubber from pontianak, which consists in subjecting the pontianak to the action of a mixture of naphtha, acetone oil and acetone for a time sufficient to isolate the rubber; said mixed acetone oil and acetone being present in a quantity sufficient to precipitate the said rubber, substantially as described.

2. The process of obtaining india rubber from pontianak, which consists in subjecting the pontianak to the action of a mixture of substantially one part of naphtha, one part acetone oil, and slightly more than one part acetone, and for a time sufficient to isolate the rubber, substantially as described.

3. The process of obtaining india rubber from pontianak, which consists in subjecting the pontianak to the action of a mixture of substantially equal parts of naphtha, and acetone oil, and slightly more than one part of acetone and for a time sufficient to isolate the rubber, agitating the pontianak while being acted upon by the mixture; and subjecting the recovered rubber to the action of boiling water, substantially as described.

In testimony whereof, I affix my signature, in presence of two witnesses.

ALBERT R. ELLISON.

Witnesses:
T. A. WITHERSPOON,
N. W. BLOSS.